United States Patent
Kurple

(10) Patent No.: US 7,509,929 B2
(45) Date of Patent: Mar. 31, 2009

(54) SYSTEM AND METHOD TO CONTROL TEMPERATURE OF AN ALTERNATOR AND/OR AN ENGINE IN A VEHICLE

(75) Inventor: Alexander C. Kurple, Casco, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/671,407

(22) Filed: Feb. 5, 2007

(65) Prior Publication Data
US 2008/0185925 A1    Aug. 7, 2008

(51) Int. Cl.
*F01P 5/10* (2006.01)
*F01P 1/06* (2006.01)

(52) U.S. Cl. .............. 123/41.44; 123/41.31; 123/198 C

(58) Field of Classification Search .............. 123/41.44, 123/198 C, 198 R, 41.31
See application file for complete search history.

(56) References Cited

U.S. PATENT DOCUMENTS

| | | | |
|---|---|---|---|
| 2,070,615 A * | 2/1937 | Plante | ............ 123/41.44 |
| 4,922,148 A | 5/1990 | Kitamura | |
| 4,980,588 A | 12/1990 | Ogawa | |
| 5,373,198 A | 12/1994 | Lopez | |
| 5,655,485 A | 8/1997 | Kusase et al. | |
| 5,798,586 A | 8/1998 | Adachi | |
| 6,072,253 A | 6/2000 | Harpenau et al. | |
| 6,422,195 B1 * | 7/2002 | Powell | ............ 123/198 C |

FOREIGN PATENT DOCUMENTS

| | | | |
|---|---|---|---|
| EP | 0978928 | | 2/2000 |
| FR | 2377751 | | 8/1978 |
| FR | 2742606 A | * | 6/1997 |
| GB | 771595 | | 4/1957 |
| GB | 1362140 | | 7/1974 |
| JP | 09046970 A | * | 2/1997 |
| KR | 410488 B | * | 12/2003 |

* cited by examiner

*Primary Examiner*—Noah Kamen
(74) *Attorney, Agent, or Firm*—Julia Voutyras; Alleman Hall McCoy Russell & Tuttle LLP

(57) ABSTRACT

A method of controlling alternator temperature and engine temperature for a vehicle is provided. The method comprises rotating a first drive shaft to generate electricity during an operation of an engine; rotating a second drive shaft to cause pumping of coolant to cool at least portion of the alternator and the engine where the first and second drive shafts are operatively coupled such that rotation of the first drive shaft imparts rotation to the second drive shaft; and selectively routing coolant through multiple different fluid pathways in response to an engine operation condition.

27 Claims, 11 Drawing Sheets

SYSTEM AND METHOD TO CONTROL TEMPERATURE OF AN ALTERNATOR AND/OR AN ENGINE IN A VEHICLE

FIELD

The present application relates to a system and method to control temperature of an alternator and/or an engine of a vehicle.

BACKGROUND AND SUMMARY

A rotary electric machine such as an alternator, generator or an electric motor (generator) in a vehicle produces heat. Various air cooling systems have been used in the past to prevent overheating of the machine. However, the cooling capacity of such a system may not be sufficient to produce the desired cooling effect. This limitation can constrain the output current from the alternator.

To increase cooling efficiency, a cooling system utilizing water as a coolant has been proposed. For example, U.S. Pat. No. 5,655,485 discloses a rotary electric machine having an engine-cooling water pump integrally combined therewith and disposed next to the stator of the engine. The disclosed water pump and the alternator have the same drive shaft, which is driven by the crank shaft of the engine. The impeller of the water pump is rotated at the same speed as the rotor and drives water through the water passage to cool the stator.

The inventor herein has recognized several disadvantages of the above approach. For example, coolant flow rate cannot be adjusted independently to control the engine and the alternator temperature based on the engine operating conditions. Further, the location of the water pump increases the length of the alternator assembly, which can be undesirable from a packaging perspective.

To address the above problems, an integrated alternator and water pump for a vehicle is provided. The integrated alternator and water pump comprises an alternator rotor mounted on a first drive shaft; and a water pump impeller mounted on a second drive shaft, wherein the water pump impeller is configured to cause pumping of coolant in response to rotation of the second drive shaft, and where the first and second drive shafts are operatively coupled such that rotation of the first drive shaft imparts rotation to the second drive shaft. In one embodiment, the speed of the water pump impeller can be varied different from the alternator rotor. Thus, coolant flow rate can be adjusted in response to an engine operating condition such as an engine temperature.

According to another aspect, an integrated alternator and water pump for a vehicle are provided. The integrated alternator and water pump comprises an alternator rotor mounted on a first drive shaft; and a water pump impeller mounted on a second drive shaft, wherein the water pump impeller is configured to cause pumping of coolant in response to rotation of the second drive shaft, and where the first and second drive shafts are operatively coupled such that rotation of the first drive shaft imparts rotation to the second drive shaft. In one embodiment, drive shafts of the alternator and water pump are not coaxial. Thus, the water pump can be disposed at the top, bottom and sides of the alternator. These configurations can reduce the packaging limitations of the alternator.

According to yet another aspect, a method of controlling alternator temperature and engine temperature for a vehicle is provided. The method comprises rotating a first drive shaft to generate electricity during operation of an engine; rotating a second drive shaft to cause pumping of coolant to cool at least portion of the alternator and the engine where the first and second drive shafts are operatively coupled such that rotation of the first drive shaft imparts rotation to the second drive shaft; and selectively routing coolant through multiple different fluid pathways in response to an engine operation condition.

In one embodiment, coolant is routed through the alternator and the engine without routing through a heat exchanging device when the engine temperature is low. In this way, the heat generated from the alternator can be used to warm up the engine coolant during cold start because the alternator coils and electronics heat faster than the engine. Thus, the time for the engine to reach the efficient operating temperature can be reduced. Consequently, fuel economy and emission reduction can be improved.

DETAILED DESCRIPTION

Figure 1:
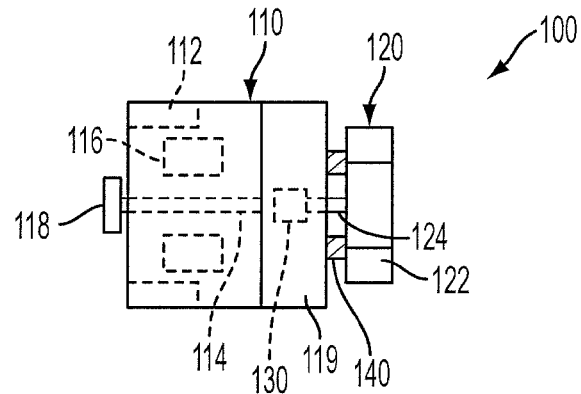
FIG. 1 is a schematic diagram illustrating a first exemplary embodiment of an integrated alternator and water pump.

FIG. 1 is a schematic diagram illustrating a first exemplary embodiment of an integrated alternator and water pump. In some embodiments, alternator 110 may include a permanent magnet rotor 112 or an electromagnetic rotor, a drive shaft or a rotor shaft 114, a stator 116 and a drive pulley 118. The driving power transmitted to drive pulley 118 may rotate the drive shaft 114 of alternator 110. The rotation of drive shaft 114 in turn causes the rotation of a water pump impeller 122 through a coupler 130. A power electronics section 119 in alternator 110 may include a rectifier (not shown) to rectify an electromotive force and a voltage regulator (not shown) to maintain a constant electromotive force induced in the stator coil (not shown). Rectifier may include power diodes or transistors, and voltage regulator.

Coupler 130 may be any suitable coupling device that can transmit a rotation from one drive shaft to another drive shaft. In some embodiments, coupler 130 may be a gear coupling. The gear coupling may enable the alternator and the water pump to operate at the same rotational speed. Alternatively, drive shaft 124 may be connected to a gear that meshes with a different size gear on drive shaft 114. Thus, water pump impeller 122 may be run at a different speed from alternator rotor 112. In some embodiments, the impeller and the alternator rotor may be coupled by pulleys. In one embodiment, the impeller and the alternator rotor may be coupled by one set of pulleys to run at the same speed. Optionally, the impeller and the alternator rotor may be coupled internally with a second set of pulley to vary the speed of the water pump impeller different from the alternator or vice versa. In some embodiments, coupler 130 may be a variable speed transmission to vary the speed of the alternator rotor and water pump impeller. In some embodiments, coupler 130 may be a magnetic coupling, magnetorheological coupling (i.e., coupling that uses a magnetic particle or fluid that solidifies in an electric or magnetic field), viscous coupling, or electric clutch that can be turned off to disengage either the alternator or water pump if either alternator or water pump is not needed to operate.

In some embodiments, alternator 110 and water pump 120 may be integrated at least partially in a common housing. A seal 140 may be used to seal water pump 120 from components of alternator 110 to prevent coolant from leaking into alternator 110. It should be appreciated that seal may not be used in some embodiments. For example, the alternator may use materials that are resistant to the harm from the coolant. In another example, the pump may use coolant that does not harm the alternator components. Thus, heat transfer between the coolant and alternator may be improved.

Water pump 120 may be disposed adjacent to alternator at different locations. In the depicted embodiment, the water pump 120 may be disposed at the back of the alternator 110 so that water pump 120 may be adjacent or share a side with electronics section 119.

Figure 2:
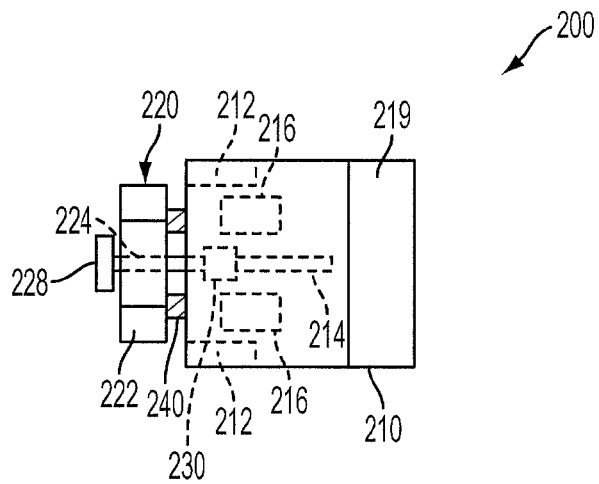
FIG. 2 is a schematic diagram illustrating a second exemplary embodiment of an integrated alternator and water pump.

FIG. 2 is a schematic diagram illustrating a second exemplary embodiment of an integrated alternator and water pump. The integrated alternator and water pump 200 may include an alternator section 210 and a water pump section 220. In some embodiments, alternator 210 may include a permanent magnet rotor 212, a drive shaft 214, a stator 216 and a power electronics section 219. The integrated alternator and water pump may be driven by a drive pulley 228.

Water pump 220 may be operatively coupled to alternator 210 by coupling a rotor shaft 214 and a drive shaft 224 of a water pump impeller 222. During operation, a pulley 228 may be driven by a belt (not shown) of the engine to cause a rotation of rotor shaft 224 to cause pumping of coolant in an engine cooling system. Rotation of rotor shaft 224 may be transmitted through the coupler 230 to drive shaft 214 of the alternator to generate electricity.

As described above in detail with reference to FIG. 1, coupler 230 may be any suitable coupling device that can transmit or impart a rotation from one drive shaft to another shaft. In some embodiments, coupler 230 may cause changes in rotation speed of the drive shaft of water pump that are different from speed or speed changes of the alternator rotor.

Figure 3:
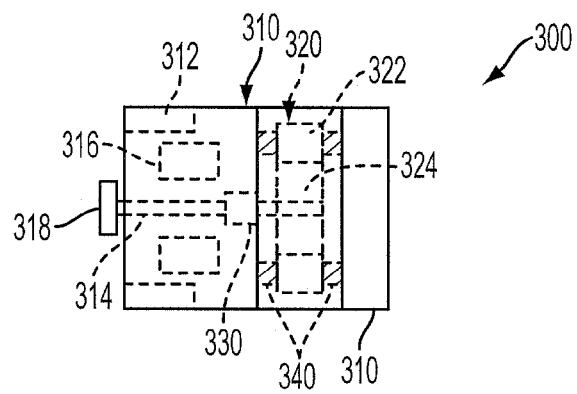
FIG. 3 is a schematic diagram illustrating a third exemplary embodiment of an integrated alternator and water pump.

FIG. 3 is a schematic diagram illustrating a third exemplary embodiment of an integrated alternator and water pump. In the depicted embodiment, a water pump 320 may be disposed in the middle of an alternator 320 between an alternator stator 316 and a power electronics section 319 of the alternator. Wires (not shown) in alternator 310 may go over water pump 320 to connect electrical current generating components in stators 316 with electronics section 319. In some embodiments, the driving power transmitted to the pulley 318 may rotate a drive shaft 314 of alternator 310. The rotation of drive shaft 314 causes the rotation of a water pump impeller 322 through a coupler 330. As described above in details with reference to FIG. 1, coupler 330 may be any suitable coupling devices that can transmit a rotation from one drive shaft to another shaft. In some embodiments, coupler 330 may cause the rotation speed of drive shaft 324 of water pump 320 to be different from speed of the alternator rotor 312.

In some embodiments, alternator 310 and water pump 320 may be integrated at least partially in a common housing. A seal 340 may be used to prevent the leaking of coolant into alternator 310.

The above embodiment may improve cooling efficiency to the alternator because water pump and associated fluid pathway share a side with both stator and electronics in the alternator.

Figure 4:
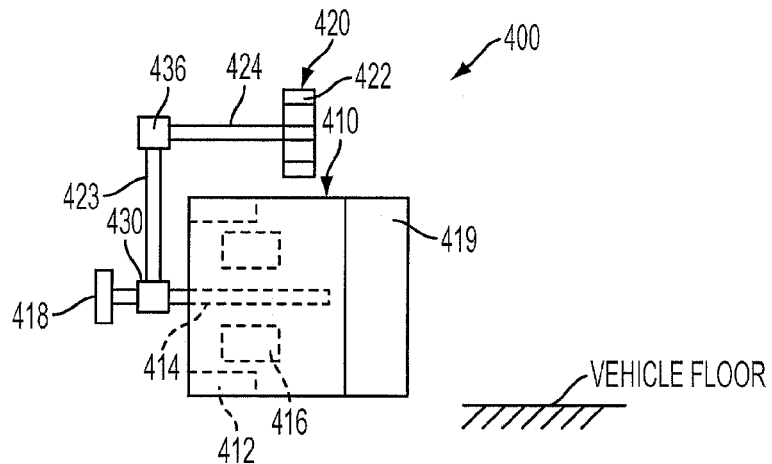
FIG. 4 is a schematic diagram illustrating a fourth exemplary embodiment of an integrated alternator and water pump.

FIG. 4 is a schematic diagram illustrating a fourth exemplary embodiment of an integrated alternator and water pump. In some embodiments, the drive shafts of alternator 410 and water pump 420 may not be coaxial. In some embodiments, the drive shafts of alternator 410 and water pump 420 may be substantially parallel. A transmission device may transmit the driving power to a drive shaft 424 which is not coaxial with the pulley mechanism. In the depicted embodiment, the transmission device may include couplers 430, 436 and shaft 423 coupled between therein. As described above in detail with reference to FIG. 1, the speed transmission device may be any suitable coupling device that can impart a rotation from one drive shaft to another shaft. In one embodiment, the speed transmission device may cause the rotation speed of drive shaft 424 of water pump 420 to rotate at the same speed as a drive shaft 414 of an alternator rotor 412. Alternatively, speed transmission device may cause the rotation speed of drive shaft 424 to rotate at a different speed from the speed of drive shaft 414. Rotation of the drive shaft 414 rotates an alternator rotor 412 to generate electricity. The driving power of the drive shaft 414 also imparts a rotation to drive shaft 424 of water pump 420 to cause pumping of coolant through a water pump impeller 422 to fluid pathways in an engine cooling system.

In some embodiments, alternator 410 and water pump 420 may be integrated at least partially in a common housing. In the depicted embodiment, water pump 420 is located on a top of alternator 410, relative to a cross section of the alternator. Alternatively, the water pump may be located at a bottom, relative to a cross section of the alternator. Additionally, the water pump may be disposed at any location on the periphery of the alternator. For example, the water pump may be located at sides of the alternator relative to a cross section of the alternator.

As described above, seals may be used to prevent the leaking of coolant into alternator 410. FIG. 4 also shows that alternator 410 may include a permanent magnet rotor 412, a stator 416, and a power electronics section 419. Water pump 420 may include a water pump impeller 422.

The embodiments describe above may reduce the length of the integrated alternator/water pump in a direction of drive shaft compared to the embodiments shown if FIGS. 1-3. Thus, the packaging limitations of the alternator in a vehicle may be reduced.

Figure 5:
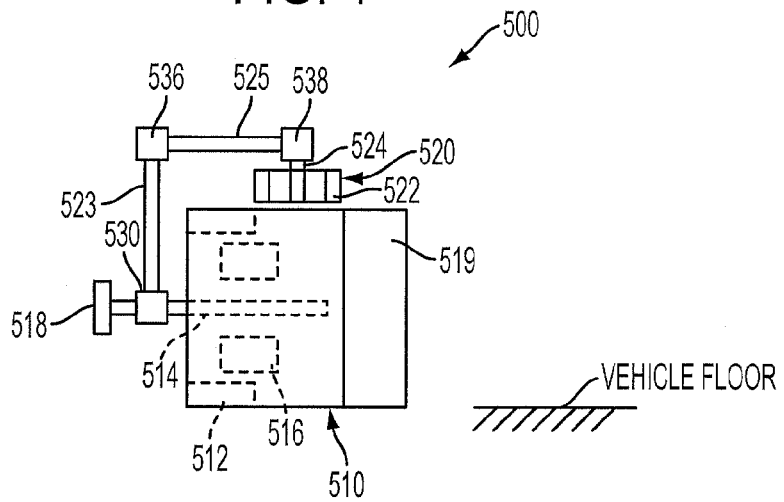
FIG. 5 is a schematic diagram illustrating a fifth exemplary embodiment of an integrated alternator and water pump.

FIG. 5 is a schematic diagram illustrating a fifth exemplary embodiment of an integrated alternator and water pump. In the depicted embodiment, a drive shaft 514 of an alternator 510 may be substantially perpendicular to a drive shaft 524 of a water pump 520. The driving power transmitted to pulley 518 may rotate drive shaft 514 of alternator 510 at the same speed as pulley 518 to generate electricity. A transmission device may transmit the rotation speed of drive shaft 514 to drive shaft 524. In the depicted embodiment, the transmission device may include couplers 530, 536, and 538 and shafts 523 and 525. As described above in details with reference to FIG. 1, speed transmission device may be any suitable coupling devices that can impart a rotation from one drive shaft to another shaft. In some embodiments, speed transmission device may cause drive shaft 524 of water pump 520 to rotate at the same speed or at different speed with alternator drive shaft 514. Rotation of drive shaft 524 of water pump 520 may cause pumping of coolant through water pump impeller 522 to fluid pathways in an engine cooling system of the engine.

FIG. 5 also shows that alternator 510 may include a permanent magnet rotor 512, a stators 516, and a power electronics section 519.

In some embodiments, alternator 510 and water pump 520 may be integrated at least partially in a common housing. In the depicted embodiment, water pump 520 is located on a top of alternator 510 relative to a vehicle floor. Alternatively, the water pump may be disposed at any location on the periphery of the alternator. For example, the water pump may be located at a bottom of the alternator relative to a vehicle floor or at sides of the alternator relative to drive shaft 514. Optionally, the water pump may be disposed adjacent to the stator portion, electronics portion, or adjacent at least partially both stator and electronics portions of the alternator.

As described above, seals may be used to prevent the leaking of coolant into alternator 510.

The embodiments described above may reduce the length of the integrated alternator/water pump compared to the embodiments shown in FIGS. 1-3. Further, the height of the integrated alternator/water pump may be decreased compared to the embodiment shown in FIG. 4 because the smaller dimension of the water pump is added to the height of the integrated alternator/water pump. Thus, more packaging flexibility of the alternator in a vehicle is provided. Furthermore, the water pump and associated fluid pathways may be disposed at any periphery place of the alternator that may generate more heat than other places. Thus, cooling efficiency can be improved because the contact areas between the heated parts of the alternator and the coolant pathways may be increased.

Figure 6:
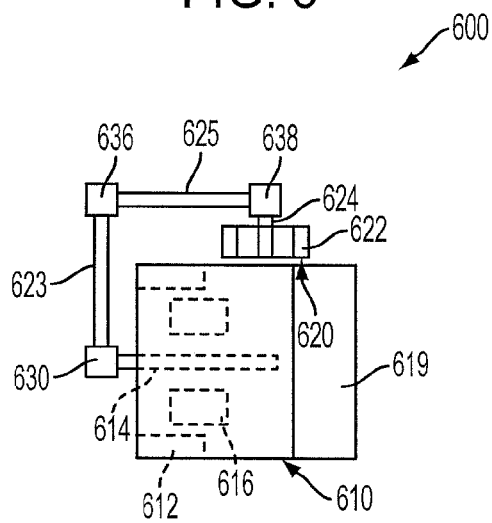
FIG. 6 is a schematic diagram illustrating a sixth exemplary embodiment of an integrated alternator and water pump.

FIG. 6 is a schematic diagram illustrating a sixth exemplary embodiment of an integrated electric rotary machine and water pump. In the depicted embodiment, an electric rotary machine 610 (e.g., electric motor) is shown to be integrated with a water pump 620. A water pump impeller 622 may be driven by the power imparted from a motor rotor 612. FIG. 6 shows that the integrated electric rotary machine and water pump may include stators 616, a power electronics section 619, a drive shaft 614 of electric machine 610, a water pump impeller 622, a drive shaft 624, couplers (630, 636, 638) and shafts (623, 625).

The embodiment shown in FIG. 6 is similar to the embodiment in FIG. 5 except that the alternator is replaced with the electric rotary machine. In one embodiment, the electric rotary machine may be a generator. In another embodiment, a generator may be modified to include larger wire and power electronics to allow the generator to start the engine by running the generator as a motor. The coolant system of this application allows less expensive electronics to be used and increases the starting power of the starter generator.

It should be appreciated that a water pump may also be integrated into an electric machine in accordance with the configurations similar to embodiments depicted in FIGS. 1 to 4.

Further, it should be appreciated that more than one pump may be included in the integrated electric rotary machine and water pump system or the integrated alternator and water pump. The inclusion of more than one pump may supply the desired total power for a cooling system while reduce the size of individual pumps. Thus, more packaging flexibilities are provided for the integrated system. Furthermore, the water pumps may be selectively operated in response to an engine operating condition to improve cooling efficiency and fuel economy.

Note that the locations of the couplers connecting drive shafts are schematic in FIGS. 1-6. The couplers can be at any suitable place to accommodate the packaging requirement of the integrated alternator/water pump in a vehicle.

Figure 7:
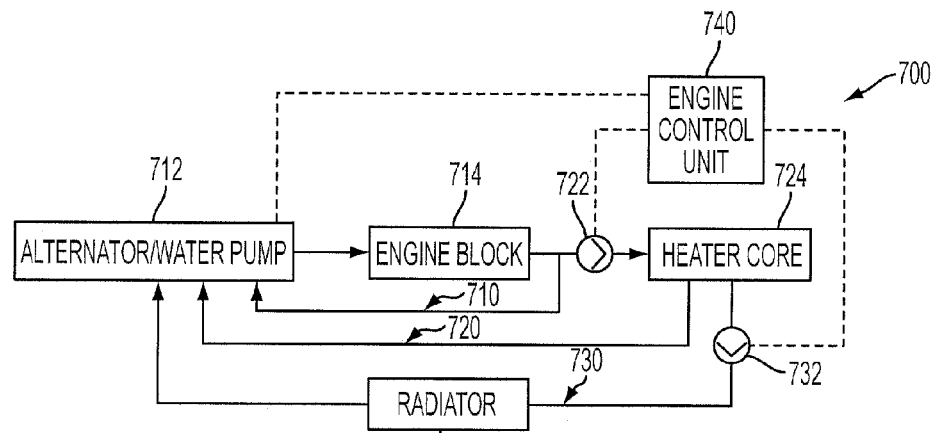
FIG. 7 shows a schematic diagram illustrating a first embodiment of fluid pathways in a cooling system of a vehicle.
Figure 8:
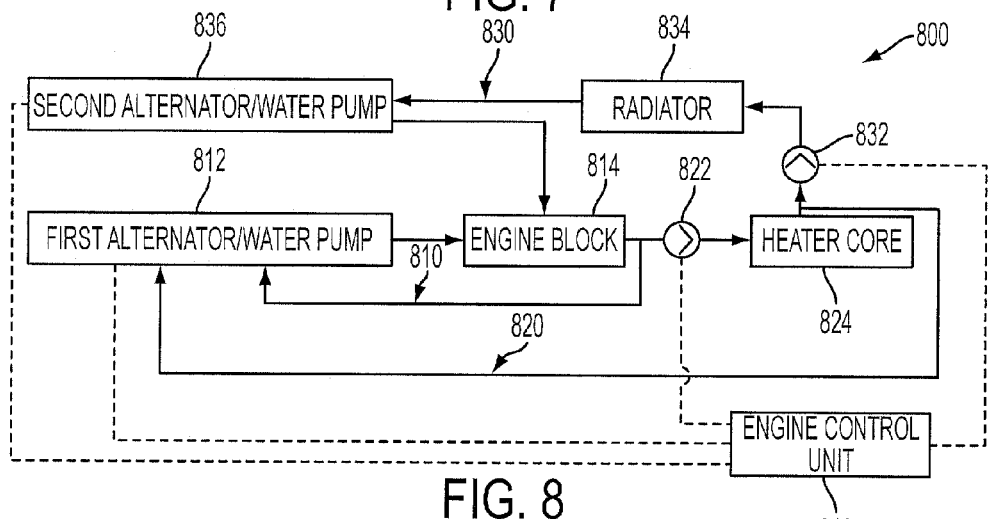
FIG. 8 shows a schematic diagram illustrating a second embodiment of fluid pathways in a cooling system of a vehicle.
Figure 9:
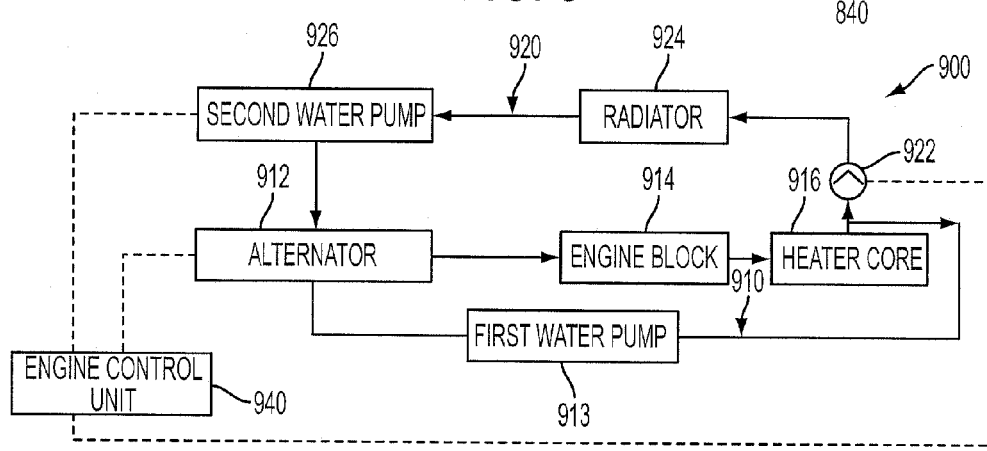
FIG. 9 shows a schematic diagram illustrating a third embodiment of fluid pathways in a cooling system of a vehicle.

FIGS. 7-9 show schematic diagrams of exemplary fluid pathways in an engine cooling system of a vehicle. FIG. 7 shows a schematic diagram illustrating a first embodiment 700 of fluid pathways. The coolant may be selectively routed or circulated through different fluid pathways based on engine operating conditions. A fluid pathway 710 is shown to include a route passing through an integrated alternator/water pump 712, an engine block 714 and back to alternator/water pump 712. A fluid pathway 720 may include a route passing through an integrated alternator/water pump 712, the engine block 714, a thermostat or valve 722, a heater core 724 and back to alternator/water pump 712. The fluid pathway 730 may include a route passing through integrated alternator/ water pump 712, engine block 714, thermostat or valve 722, heater core 734, a thermostat or valve 732 and back to alternator/water pump 712.

The circulation of cooling in fluid pathway may be controlled by the engine control unit 740 through controlling valves 722 and 732 based on engine operating conditions. The operating status of the valves determines the fluid pathway through which the coolant is circulated. For examples, coolant may be circulated through fluid pathway 710 when both valves 722 and 732 are closed. Coolant may be circulated through fluid pathway 720 when valve 722 is open and valve 732 is closed. Opening of both valves 722 and 732 allows the coolant to be circulated in fluid pathway 730.

Engine control unit may also control the operation of the water pump in some embodiments such as control the rotation speed of water pump impeller, etc. When the integrated alternator/water pump system has more than one water pump, the engine control unit may selectively operate one or more water pump based on engine operating conditions. The control strategy will be described in detail below.

FIG. 8 shows a schematic diagram illustrating a second embodiment of fluid pathways in an engine cooling system of a vehicle. In the depicted embodiment, coolant may be routed through three fluid pathways. A pathway 810 may route coolant through a first alternator/water pump 812, an engine block 814, and back to the first alternator/water pump 812. A pathway 820 may route coolant through the first alternator/water pump 812, the engine block 814, a thermostat or valve 822, a heater core 824, and back to the first alternator/water pump 812. The pathway 830 may route coolant through a second alternator/water pump 836, engine block 814, thermostat or valve 822, the heater core 824, a thermostat or valve 832, a radiator 834, and back to the second alternator/water pump 836.

The routing of coolant through different fluid pathways may be controlled by valves 822 and 832 through the engine control unit 840 as described above with reference to FIG. 7. Engine control unit 840 may control the operations of the first and second alternator/water pumps based on engine operating conditions. The control strategy will be described in detail below.

FIG. 9 shows a schematic diagram illustrating a third embodiment of fluid pathways in a cooling system of a vehicle. In the depicted embodiment, the coolant may be driven by two water pumps through two fluid pathways, respectively. The two water pump may be coupled operatively or integrated into one alternator as described above with reference with FIGS. 1-6. A coolant in the pathway 910 may be driven by a first water pump 913. Pathway 910 may route coolant through an alternator 912, an engine block 914, a heater core 916, and back to alternator 912. Coolant in a pathway 920 may be driven by a second water pump 926. Pathway 920 may route coolant through alternator 912, engine block 914, heater core 916, a thermostat or valve 922, a radiator 924, and back to alternator 912.

The routing of coolant through different fluid pathways may be controlled by valve 922 through an engine control unit 940 as described above with reference to FIG. 7. Engine control unit 940 may control the operations of the alternator, the first and second water pumps based on engine operating condition. The control strategy will be described in detail below.

It should be appreciated that the above embodiments are but examples, and that many variations are possible. For example, in one variation, an engine cooling system may comprise a closed coolant path including an alternator/water pump and an engine block. At startup conditions, the initial cooling of the alternator may be provided by a sealed amount of coolant. Once the coolant has reached a predetermined alternator operating temperature, alternator fans and heat sinks may be used to cool the alternator.

Figure 10:
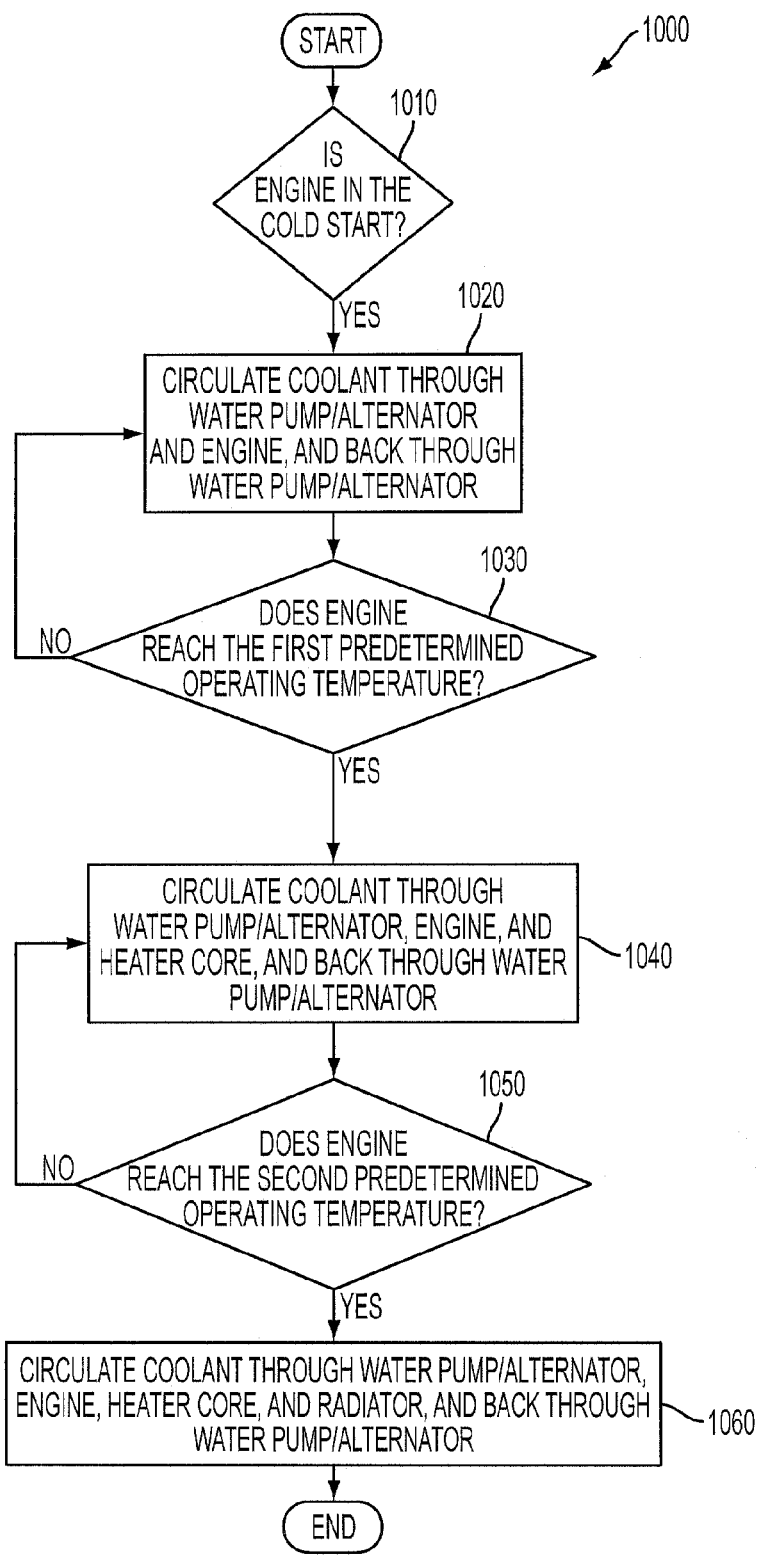
FIG. 10 show a first example routine to control the alternator temperature and engine temperature in a vehicle.

FIGS. 10-13 are example routines to control the alternator temperature and engine temperature in a vehicle. FIG. 10 shows a first example routine to control the alternator temperature and engine temperature in a vehicle. In some embodiments, the engine coolant system 700 as shown in FIG. 7 may be used to implement the routine 1000. The control routine is described herein with reference to FIG. 7. Beginning at 1010, the routine determines whether the engine is in a low temperature condition. The low temperature condition may be an engine cold start. If the answer is yes, the routine includes, in 1020, circulating coolant through an integrated alternator/water pump, engine, and back through the alternator water pump or circulating coolant through fluid pathway 710. During the cold start, the temperature of the alternator coils may increase faster than the temperature in the engine. The wires and electronics in the alternator may heat the coolant quickly. By routing coolant through the alternator and engine without going through other heat exchange equipment such as the heater core and radiator, heat generated from the alternator may be used to increase the coolant temperature to warm up the engine. Thus, the time required for efficient operating of the engine may be reduced.

Next, the routine, in 1030, determines whether the engine reaches a first predetermined operating temperature. The first predetermined operating temperature may be a temperature desirable for the engine operation at normal load. For example, the first predetermined operating temperature may be an optimal temperature to reduce wear on engine, reduce emissions, improve fuel economy, produce heat for external use, or increase power from the engine. If the answer is no, the routine may go to 1020. If the answer is yes, the routine proceeds to 1040 to circulate the coolant through alternator/water pump, engine, heater core and back through alternator water pump or the routine routes the coolant through fluid pathway 720 as shown in FIG. 7. The heater core may be a heat exchanger used to heat the passenger compartment of the vehicle or provide heat to another area of a vehicle having a lower temperature than the engine.

Next, the routine determines, in 1050, whether the engine reaches a second predetermined operating temperature. If the answer is no, the routine may go to 1040. The second predetermined operating temperature may be a maximum temperature to operate the engine. The maximum temperature may be the highest temperature that the engine can operate without degradation of engine components. In this situation, a heat exchange device such as radiator may be used to efficiently dissipate heat and cool down the coolant. Thus, if the answer is yes, the routine, in 1060, circulates the coolant through alternator/water pump, engine, heater core, and radiator, and back through alternator/water pump or the routine circulates the coolant through fluid pathway 730 as shown in FIG. 7.

It should be noted that selective routing of the coolant through different fluid pathways may be implemented through control of thermostats or valves located in fluid pathways. For examples, the closing and opening of thermostats or valves described above with reference to FIG. 7 may selectively route the coolant in different fluid pathways.

It should be appreciated that in the embodiments described above, the coolant may consist of water, water glycol mixture, hydraulic fluid, oil, fuel, compressed air, air, or any other heat bearing solid, gas, or liquid.

Figure 11:
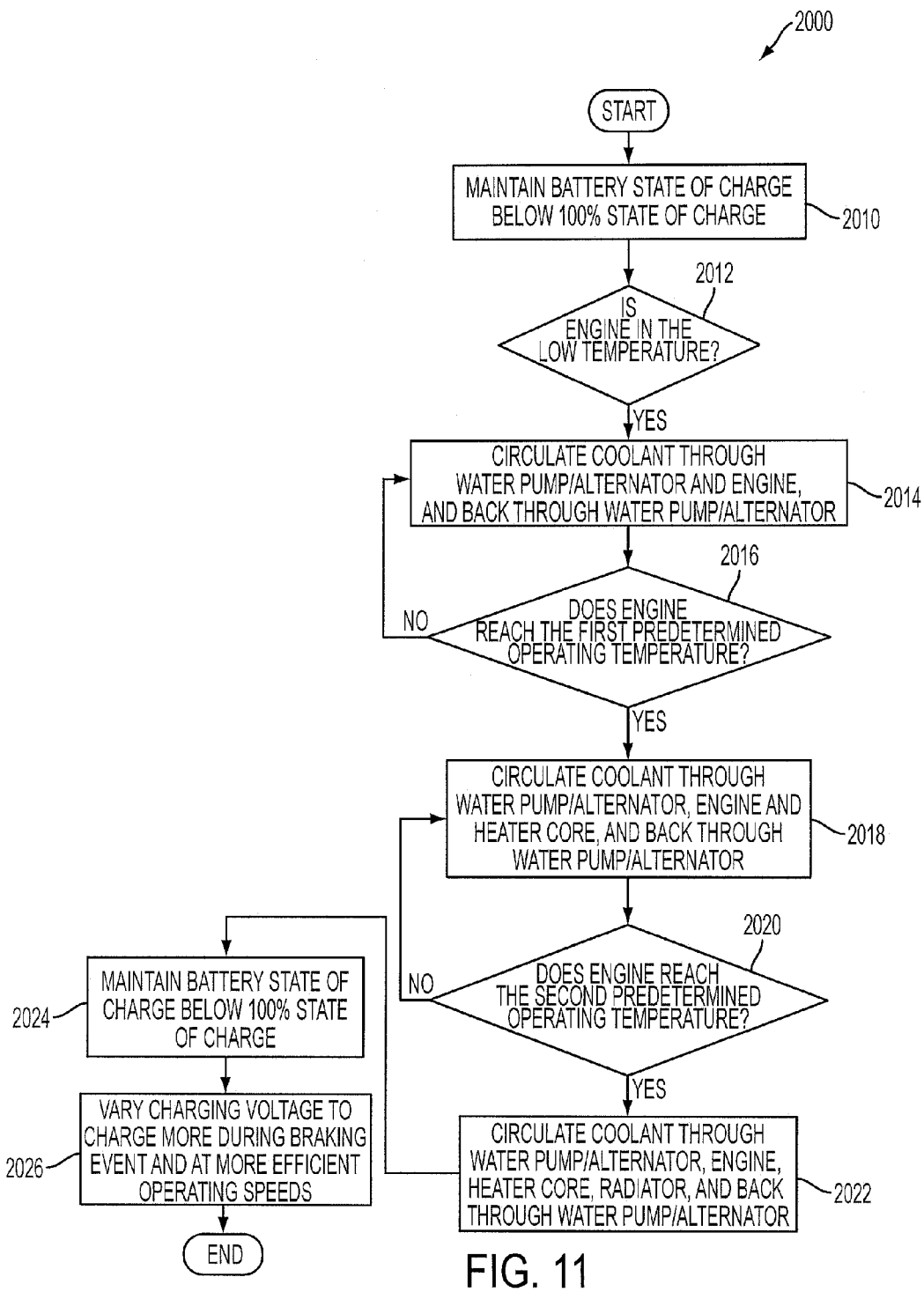
FIG. 11 show a second example routine to control the alternator temperature and engine temperature in a vehicle.

FIG. 11 shows a second example routine 2000 to control the alternator temperature and engine temperature in a vehicle. The routine 2000 is similar to the routine 1000 except that the alternator operation may be adjusted to generate desired heat based on engine operating conditions. In some embodiments, the engine coolant system 700 as shown in FIG. 7 may be used to implement the routine 2000. The control routine is described herein with reference to FIG. 7. Beginning at 2010, the routine maintains state of charge of a battery in the vehicle below 100% of state of charge. The increased load on the alternator due to the low state of charge battery increases the alternator current. Thus, more heat may be generated in the wires and electronics in the alternator. Next, the routine, in 2012, determines whether the engine is in a low temperature condition. The low temperature condition may be the period during an engine cold start. If the answer is yes, the routine includes, in 2014, circulating coolant through an integrated alternator/water pump, engine, and back through the alternator/water pump or circulating coolant through fluid pathway 710. As described above, routing coolant through the alternator and engine without routing through heat exchange device may warm up the engine faster. Because of increased current in the alternator at low battery state of charge, more heat may be generated from the alternator during the cold start. Thus, heated coolant may increase the engine temperature quickly to the efficient operating temperature.

Next, the routine, in 2016, determines whether the engine reaches a first predetermined operating temperature. If the answer is no, the routine may go to 2014. If the answer is yes, the routine proceeds to 2018 to circulate the coolant through alternator/water pump, engine, heater core and back through alternator/water pump or the routine routes the coolant through fluid pathway 720 as shown in FIG. 7.

Next, the routine determines, in 2020, whether the engine reaches a second predetermined operating temperature. If the answer is no, the routine may go back to 2018. If the answer is yes, the routine, in 2022, circulates the coolant through the alternator/water pump, engine, heater core, and radiator, and back through the alternator/water pump or the routine circulates the coolant through fluid pathway 730 as shown in FIG. 7.

In some embodiments, the routine, in 2024, may maintain battery state of charge below 100%. In this way, the battery may have capacity to accept more charge at the more efficient engine or alternator operating speeds. Then, the routine, in 2026, may vary charging voltage to charge more during braking event and at more efficient operating speeds. The operating voltage may be varied to improve the electrical efficiency of the vehicle by limiting restive losses in the alternator and electric component and increase the charge acceptance of the battery. The system voltage can be lowered to reduce electrical efficiency and increase heat generation to increase the temperature of the climate control system of engine.

Again, the selective routing among different fluid pathways in the engine cooling system may be implemented by the control system described above with reference to FIG. 7.

Figure 12:
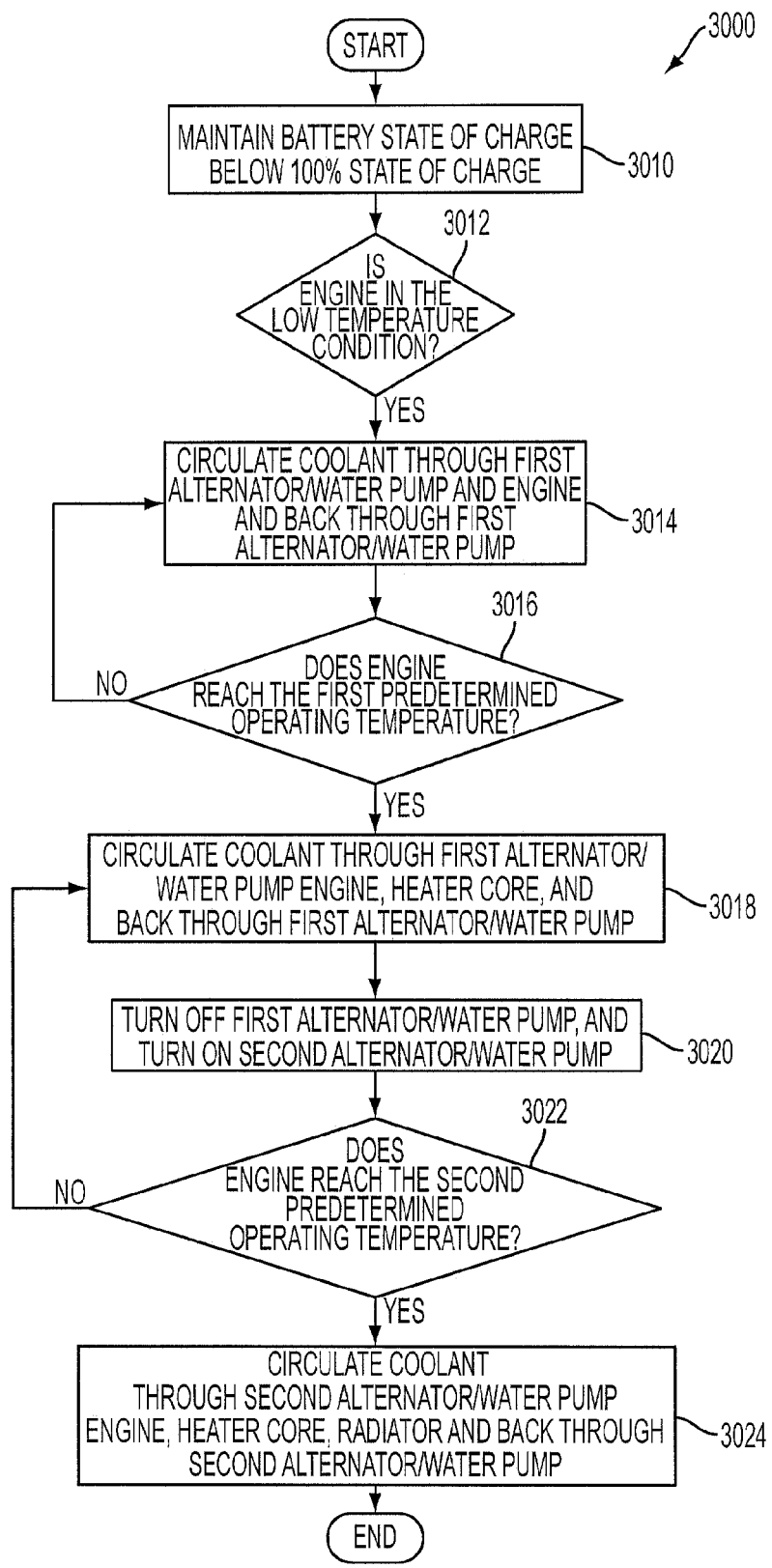
FIG. 12 show a third example routine to control the alternator temperature and engine temperature in a vehicle.

FIG. 12 shows a third example routine 3000 to control the alternator temperature and engine temperature in a vehicle. In the depicted embodiment, two integrated alternator/water pump may be used. The first alternator may be configured to heat the coolant efficiently. For example, the windings and electronics of the first alternator may be modified to generate more heat. Alternatively, a less efficient and low cost alternator that generates more heat may be used as the first alternator. In some embodiments, the first alternator may be used for recharging batteries and operating the engine at cold temperature. The second alternator may be an efficient alternator that generates more electrical power and less heat with the same mechanical power that is supplied to a less efficient alternator. The second alternator may be used during normal engine operation. In some embodiment, the engine coolant system 800 as shown in FIG. 8 may be used to implement the routine 3000. The control routine is described herein with reference to FIG. 8.

Beginning at 3010, the routine 3000 may include maintaining state of charge of a battery in the vehicle below 100% of state of charge. Next, the routine, in 3012, determines whether the engine is in a low temperature condition. The low temperature condition may be an engine cold start period. If the answer is yes, the routine includes, in 3014, circulating coolant through the first alternator/water pump, engine, and back through the first alternator/water pump or circulating coolant through fluid pathway 810 as shown in FIG. 8. As described above, the first generator may generate heat efficiently. Thus, coolant may be heated more quickly to increase engine temperature to a desired level for normal operation.

Next, the routine, in 3016, determines whether the engine reaches a first predetermined operating temperature. If the answer is no, the routine may go to 3014. If the answer is yes, the routine proceeds to 3018 to circulate coolant through the first alternator/water pump, engine, heater core and back through the first alternator/water pump or the routine circulate coolant through fluid pathway 820 as shown in FIG. 8.

Next, the routine, in 3020, turns off the first alternator/water pump and operates the second alternator/water pump. Then, the routine determines, in 3022, whether the engine reaches a second predetermined operating temperature. If the answer is no, the routine may go back to 3020. If the answer is yes, then, the routine, in 3024, circulates coolant through the second alternator/water pump, engine, heater core, and radiator, and back through the second alternator/water pump or the routine circulates coolant through fluid pathway 830 as shown in FIG. 8.

The selective routing among different fluid pathways in the engine cooling system may be implemented by the control system described above with reference to FIG. 7. The control system may also selectively control the operation of the alternators and water pumps based on engine operating conditions.

Figure 13:
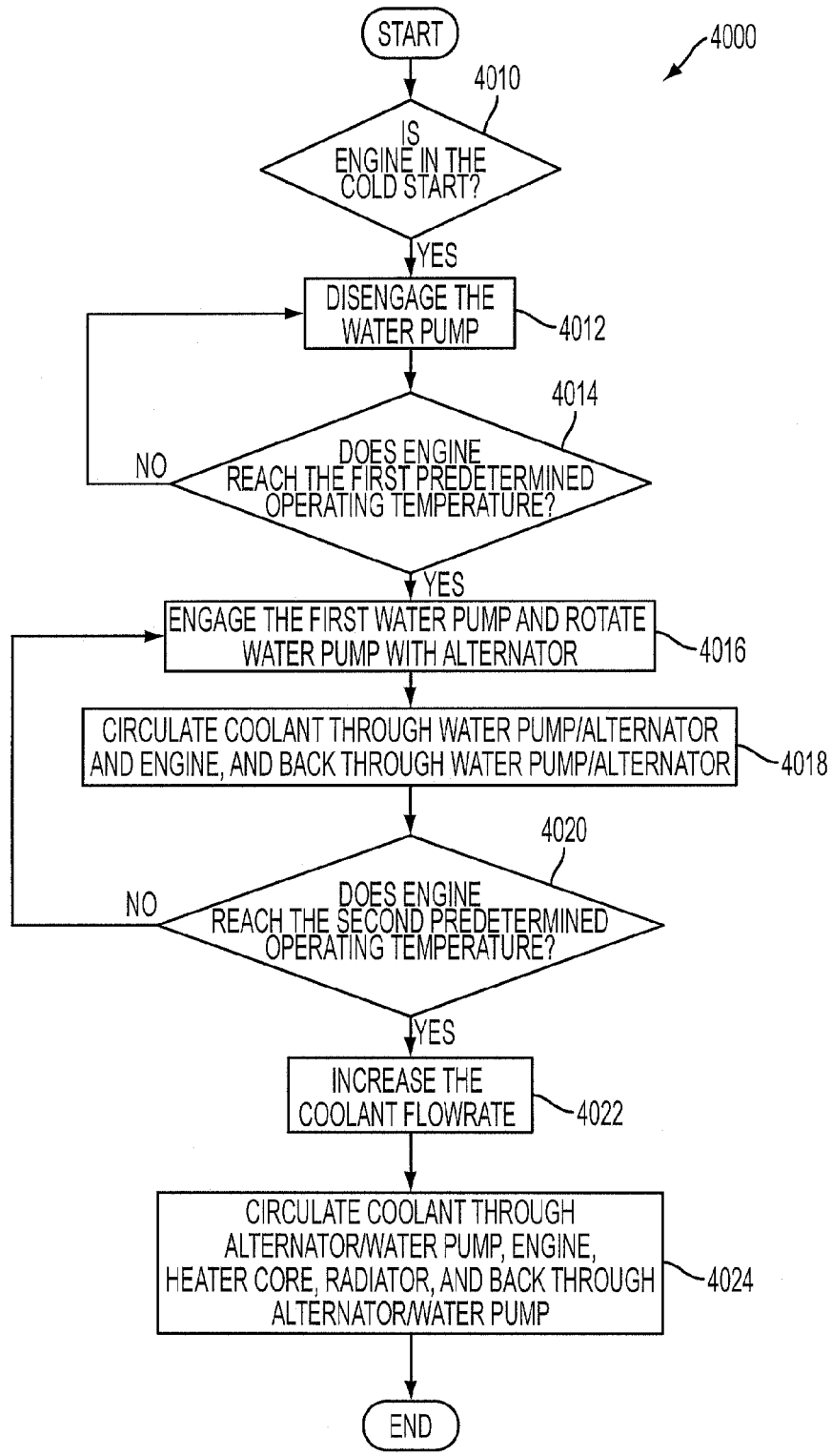
FIG. 13 show a fourth example routine to control the alternator temperature and engine temperature in a vehicle.

FIG. 13 shows a fourth example routine to control the alternator temperature and engine temperature in a vehicle. In the depicted embodiment, two water pumps which deliver the coolant at different flow rates may be used. Alternatively, one water pump having variable flow rate may be used. In some embodiments, the engine coolant system 900 as shown in FIG. 9 may be used to implement the routine 4000. The control routine is described herein with reference to FIG. 9.

Beginning at 4010, the routine determines whether the engine is in a low temperature condition. The low temperature condition may be an engine cold start period. If the answer is yes, the routine includes, in 4012, disengaging the water pump. In this condition, no coolant is circulated through the coolant system because cooling may not be required at some conditions. Next, the routine, in 4014, determines whether the engine reaches a first predetermined operating temperature. If the answer is no, the routine may go to 4012. If the answer is yes, the routine proceeds to 4016 to engage a water pump and rotate the water pump with the alternator. In some embodiments where the cooling system has two water pumps, the routine may engage a first water pump having a lower rotation speed or having lower flow rate. Next, the routine, in 4018, circulates the coolant through alternator/water pump, engine, heater core and back through alternator/water pump or the routine may circulate coolant through fluid pathway 910 as shown in FIG. 9.

Next, the routine determines, in 4020, whether the engine reaches a second predetermined operating temperature. If the answer is no, the routine may go back to 4016. If the answer is yes, the routine, in 4022, includes increasing the coolant flow rate. In some embodiments, the coolant may be pumped by a second water pump having a higher coolant flow rate. The second pump may be integrated with and coupled operatively with the alternator as described above with reference with FIGS. 1-6. Alternatively, one pump having variable speed control may be used in the engine cooling system. In this embodiment, the rotational speed of the water pump may be increased by varying the drive ratio between the water pump and alternator through a transmission device. Then, the routine, in 4024, circulates coolant through alternator/water pump, engine, heater core, and radiator, and back through alternator/water pump or the routine may circulate coolant through fluid pathway 920 as shown in FIG. 9. As the coolant flow rate is increased, the temperature of the engine and alternator may be decreased efficiently.

Figure 14:
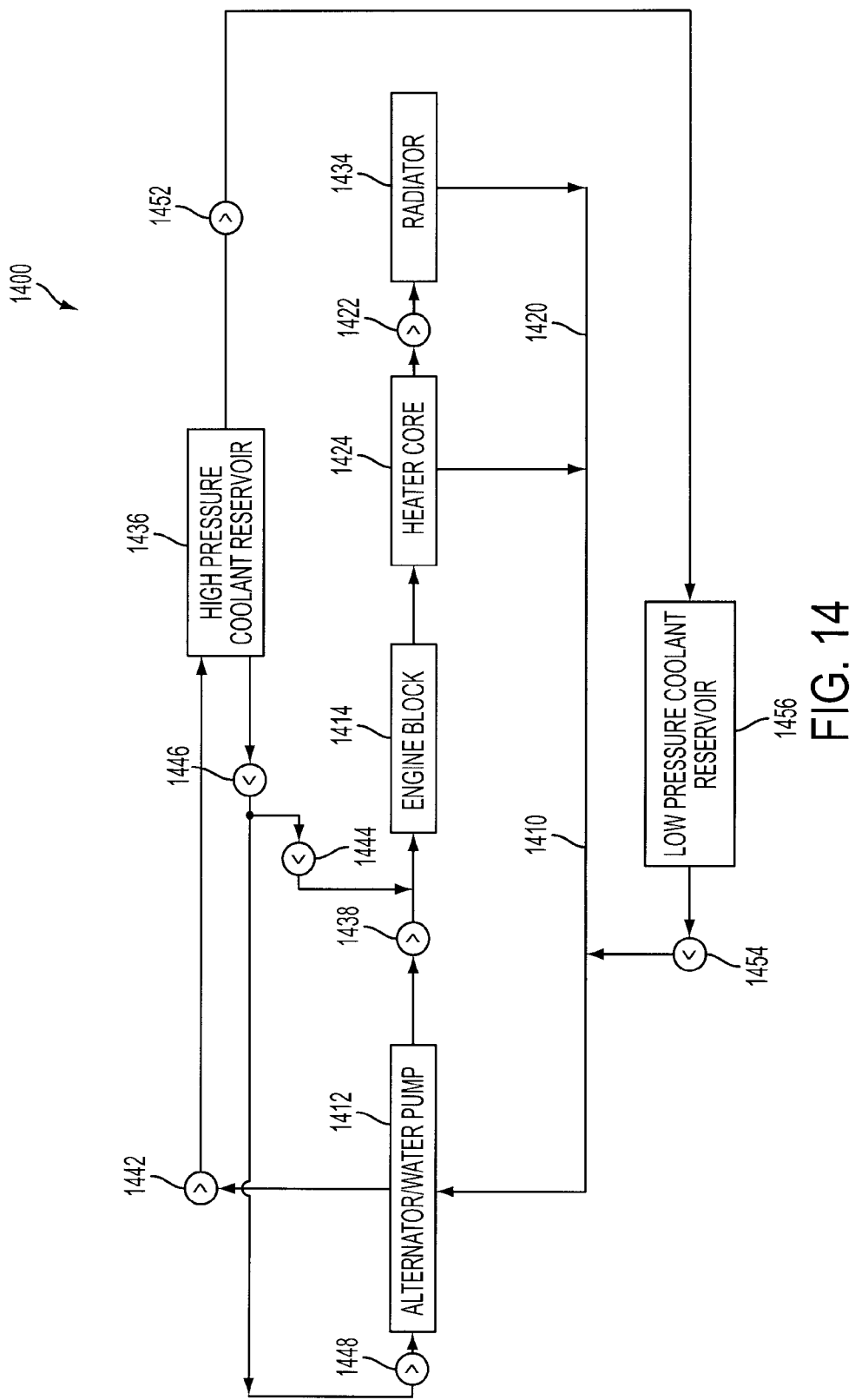
FIG. 14 shows a schematic diagram illustrating an embodiment of a cooling system having a high pressure coolant reservoir and a low pressure coolant reservoir for a vehicle engine in a vehicle.

FIG. 14 shows a schematic diagram illustrating an embodiment of a cooling system having a high pressure coolant reservoir and a low pressure coolant reservoir for a vehicle engine. An alternator and a water pump or a compressor may be integrated to improve the efficiency of the engine. The coolant used in the water pump or the compressor may include water, air, glycol mixture, fuel, hydraulic fluid, nitrogen, oil, or any suitable compressible material. The compressible material may be circulated through the integrated alternator and water pump/compressor and through pressure valves or switches to store energy in the high pressure reservoir. In one example, the energy may be released by circulating high pressure coolant to lower the engine temperature. In another example, the energy may be transferred through the alternator to start the engine or increase the power of the running engine.

Now referring to a coolant system 1400 shown in FIG. 14, coolant may be circulated with and without going through a high pressure coolant reservoir 1436 based on operating conditions of the engine. Under a standard operation where the coolant at normal pressure may cool the engine system sufficiently, coolant may be circulated through selected fluid paths without going through a high pressure coolant reservoir 1436. For example, in the depicted embodiment, pressure valve 1438 is open and pressure valves 1442, 1444, 1446, and 1448 are closed. Thus, coolant at normal pressure may be selectively routed or circulated through different fluid pathways based on engine operating conditions. For example, a fluid pathway 1410 is shown to include a route passing through an integrated alternator/water pump 1412, an engine block 1414, a heater core 1424 and back to alternator/water pump 1412. A thermostat or valve 1422 blocks coolant from routing to a radiator 1434. When the engine reaches a predetermined temperature, coolant may be circulated through a fluid pathway 1420. Under this condition, thermostat 1422 is open and coolant is circulated through alternator/water pump 1412, engine block 1414, heater core 1424, radiator 1434 and back to alternator/water pump 1412. In the depicted embodiment, fluid pathway 1420 and fluid pathway 1410 have a partially shared pathway. It should be appreciated that any suitable fluid pathway may be configured to selectively circulate coolant based on engine operating conditions. For example, embodiments such as described with reference to FIGS. 7-9 may be employed.

A desired pressure in high pressure coolant reservoir 1436 may be achieved by adjusting pressure valves. For example, valve 1438 and 1442 may be open while valves 1444, 1446, and 1448 may be closed. Thus, a portion of coolant is sent to high pressure coolant reservoir 1436 to build up the pressure. A high pressure relief valve 1452 and a low pressure relief valve 1454 may be used along with low pressure coolant reservoir 1456 to maintain the pressure between a maximum setting and a minimum setting for the coolant system.

Continuing with FIG. 14, in some embodiments, coolant in the high pressure coolant reservoir may be circulated to cool the engine. For example, when the high pressure coolant is required to decrease the engine temperature, valves 1438, 1442, 1444, and 1446 may be open and valve 1448 may be closed. Thus, higher pressure coolant may be circulated through engine block 1414, heater core 1424, radiator 1434, alternator/water pump 1412, and back to high pressure coolant reservoir 1436.

An engine control unit (not shown) may be used to control the operation of the alternator/water pump and valves shown in FIG. 14.

Figure 15:
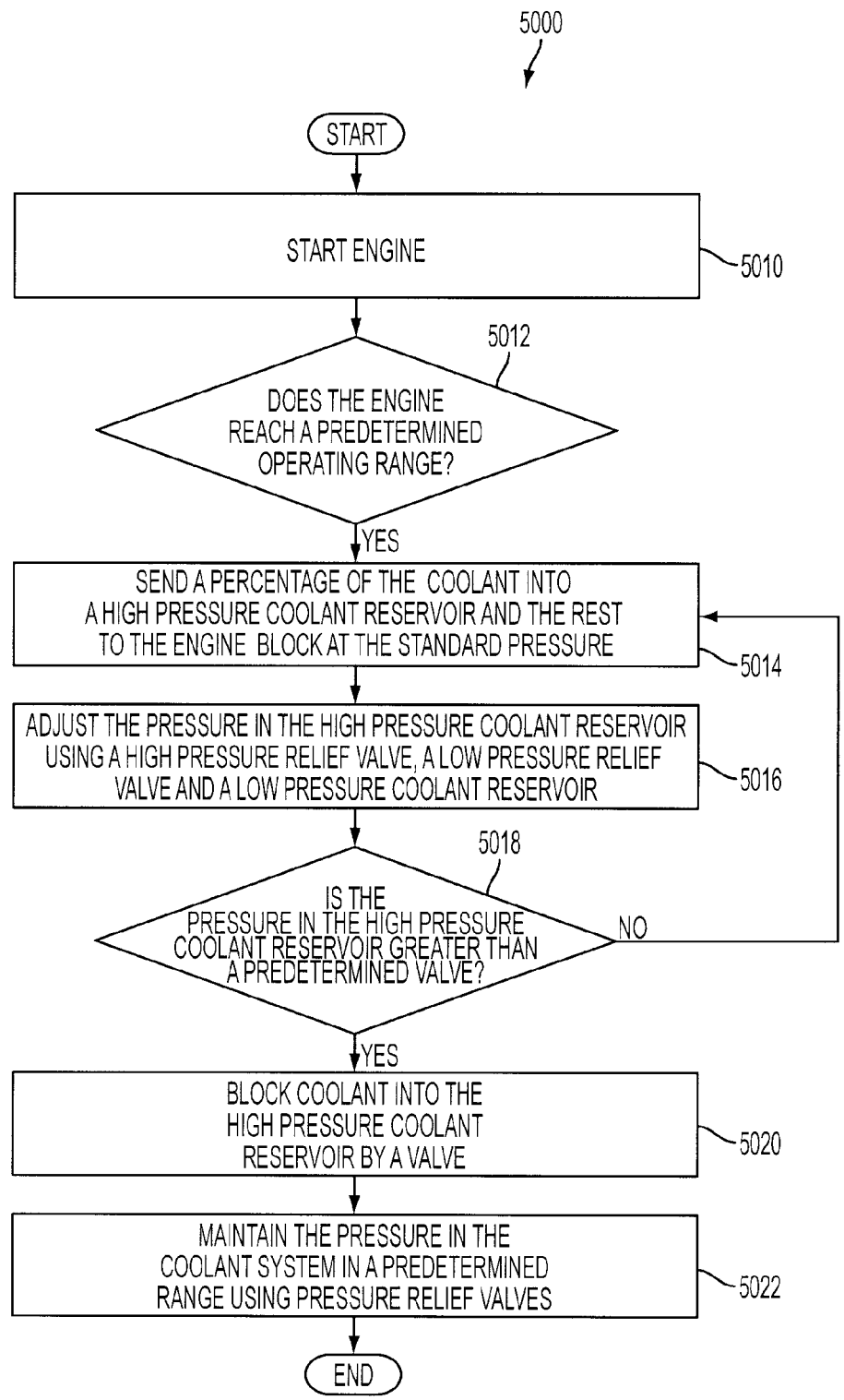
FIG. 15 shows an example routine to store energy at a high pressure coolant reservoir in an engine coolant system with an integrated alternator and pump.

FIG. 15 shows an example routine to store energy at a high pressure coolant reservoir in an engine coolant system with an integrated alternator and pump. In some embodiments, the engine coolant system as shown in FIG. 14 may be used to implement a routine 5000. The control routine is described herein with reference to FIG. 14. First, at 5010, the routine starts an engine. Then, at 5012, it is determined whether the engine reaches a predetermined operating range. In some embodiments, the operating range may be a range that a standard pressure cooling system cannot lower the engine temperature efficiently. If the answer is yes, the routine, at 5014, includes sending a percentage of the coolant into the high pressure coolant reservoir and the rest of the coolant to the engine block at the standard pressure. In some embodiments, the coolant is circulated by a pump integrated with an alternator. The pump uses mechanical energy from the mechanical connection to the engine. In the embodiment depicted in FIG. 14, valves 1442 and 1438 are open and valves 1444 and 1446 are closed.

Next, at 5016, the routine adjusts the pressure in the high coolant reservoir using a pressure relief valve, a low pressure relief valve, and a low pressure coolant reservoir. In some embodiments, a high pressure relief valve opens when the pressure exceeds a maximum pressure for the system. As a result, the coolant leaves the high pressure coolant reservoir and enters the low pressure coolant reservoir. In some embodiments, for example where compressed air is used as the coolant, coolant may be vented to atmosphere. In some embodiments, the coolant may be sent to any suitable component that uses the high pressure coolant. Further, in other embodiments, a low pressure relief valve connecting the low pressure reservoir may open to supply coolant to maintain a low pressure setting in the coolant system.

Continuing with FIG. 15, at 5018, the routine determines whether the pressure in the high pressure coolant reservoir is greater than a predetermined value. If the answer is yes, the routine, at 5020, blocks coolant into the high pressure coolant reservoir by a valve. At 5022, the routine maintains the pressure in the coolant system in a predetermined range using pressure relief valves (high pressure relief valve and/or low pressure relief valve).

It should be appreciated that the above routine may be implemented in an operation where the alternator is engaged with the engine. The routine my also be implemented in an operation where the mechanical connection to the engine in the alternator pulley is disengaged with a stopped engine or running engine. In this condition, the alternator is run as a motor using power from the battery.

Figure 16:
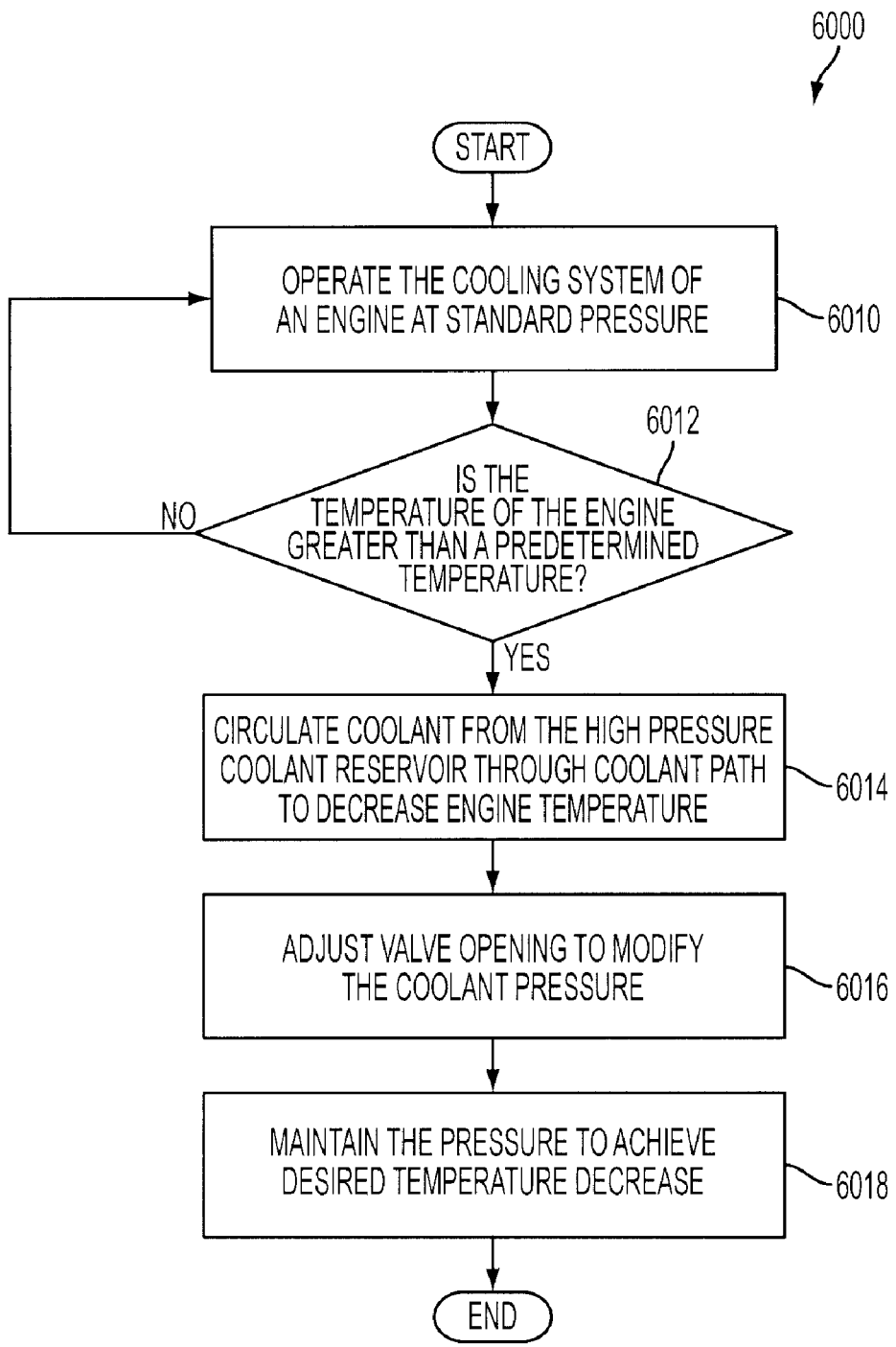
FIG. 16 shows an example routine to use a coolant at high pressure to improve engine cooling in an engine coolant system with an integrated alternator and pump.

FIG. 16 shows an example routine to use a coolant at high pressure to improve engine cooling in an engine coolant system with an integrated alternator and pump. In some embodiments, the engine coolant system as shown in FIG. 14 may be used to implement a routine 6000. At 6010, the routine first operates the engine cooling system at a standard pressure. Then, at 6012, the routine determines whether the temperature of the engine is greater than a predetermined temperature. In some embodiments, the predetermined temperature may be the highest temperature that the engine can operate without degradation of engine components. In some embodiments, the predetermined temperature may be the temperature that the cooling system at standard pressure cannot lower the temperature sufficiently.

If the answer is yes, at 6014, the routine circulates the coolant from the high pressure coolant reservoir through a coolant path to decrease the engine temperature. The coolant path for the high pressure coolant may be the path including valves 1444, 1446, and 1442 among other valves and components as described above with reference to FIG. 14. The engine temperature can be decreased because of the increased cooling capacity of the high pressure coolant. Next, at 6016, the routine adjusts the valves in the cooling system to modify the coolant pressure. At 6018, the pressure is maintained to achieve the desired temperature decrease.

Figure 17:
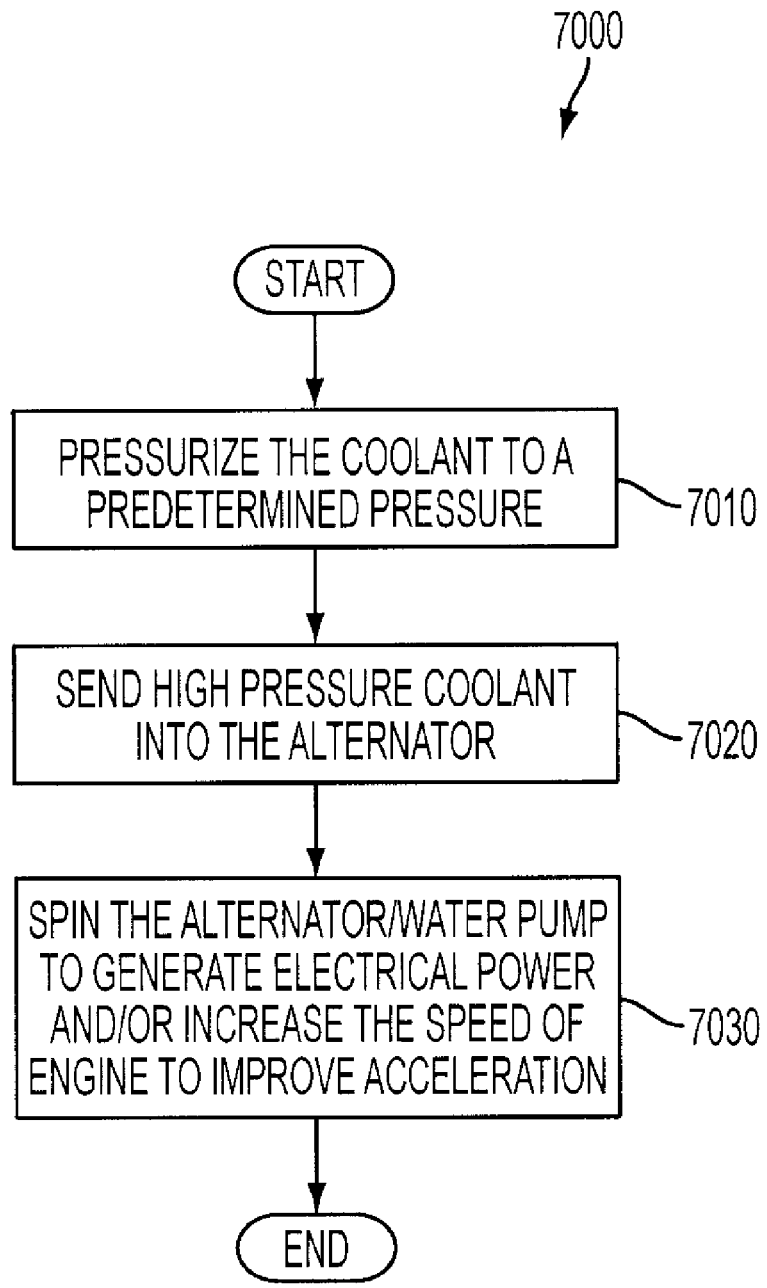
FIG. 17 shows an example routine to release energy stored in the high pressure coolant reservoir in an engine coolant system with an integrated alternator and pump.

FIG. 17 shows an example routine to release energy stored in the high pressure coolant reservoir in an engine coolant system with an integrated alternator and pump. The energy stored in the high pressure coolant reservoir may be used in the engine operation. In some embodiments, the engine coolant system as shown in FIG. 14 may be used to implement a routine 7000. The control routine is described herein with reference to FIG. 14. At 7010, a routine first pressurizes the coolant to a predetermined pressure using an engaged or disengaged alternator. At 7020, the routine sends the high pressure coolant into the alternator. Then, at 7030, the routine spins the alternator/water pump. In the embodiment depicted in FIG. 14, valve 1444 may be closed while valves 1438, 1442, 1446, and 1448 may be open. In this way, the energy released from the high pressure coolant may be used to spin the alternator. Thus, the energy released from the high pressure coolant reservoir can be used for engine operation. For example, when clutch is disengaged on the alternator, the energy from the high pressure reservoir can spin the alternator to generate electrical power required to start the engine. Further, the speed of engine can be increased to improve acceleration.

It should be appreciated that energy stored in the high pressure coolant reservoir may be used in various ways to enhance the performance of the vehicle. For example, the high pressure coolant reservoir may be used to provide power boost to the engine improving the performance of the vehicle. In some embodiments, compressed air may be used as the coolant. With the compressed air, the alternator may be sealed and the fans in the alternator may be optimized to compress air. Further, the alternator heat may be transferred to the compressed air. The energy stored in the compressed air may later be used to run the alternator as a motor or to power other equipment in the engine or vehicle. In some embodiments, the compressed air may be routed into the engine air intake with a valve that adds compressed or supercharged air to increase the power output of the engine.

The high pressure reservoir combined with the integrated alternator/water pump allows variations of the engine coolant pressure and temperature to minimize energy which otherwise may be wasted by operating outside an efficient operating range for the engine.

Furthermore, in some embodiments, the engine efficiency may be improved by adding electrodes or electronic circuit in a coolant chamber connected to an alternator current wiring of the alternator or a direct current output. Such configuration may be used to modify the air or other liquid to increase the concentration of hydrogen, oxygen, carbon dioxide, ozone, or other molecules by breaking down water vapor, oxygen, fuel, nitrogen or other compounds that are routed by the electrodes connected to the alternator. In some embodiments, the modified coolant may be combined with the rest of the coolant. In other embodiments, a secondary coolant line may be included to transfer to the components that may use the modified coolant. For example, oxygen in the modified coolant may be sent to the air intake and hydrogen in the modified coolant may be sent to the fuel lines. The change in concentration may modify the combustion in the engine to improve emissions or increase the efficiency and power of the engine.

It should be appreciated that the system and method described above may be used in the stationary engines.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An integrated alternator and water pump for a vehicle engine, comprising:
power electronics;
an alternator rotor mounted on a first drive shaft; and
a water pump impeller mounted on a second drive shaft wherein the water pump is substantially disposed between an end of an alternator stator and the power electronics in the alternator,
wherein the water pump impeller is configured to cause pumping of coolant in response to rotation of the second drive shaft, and where the first and second drive shafts are coaxial and are operatively coupled such that rotation of the first drive shaft imparts rotation to the second drive shaft wherein the alternator and the water pump are disposed at least partially within a common housing wherein a compartment in the housing includes a seal to separate the water pump from the alternator and prevent leaking of coolant from the water pump.

2. The integrated alternator and water pump of claim 1 wherein the water pump is located adjacent to power electronics in the alternator.

3. The integrated alternator and water pump of claim 1 wherein the first and second drive shafts are operatively coupled by a coupler.

4. The integrated alternator and water pump of claim 3 wherein the coupler is one of gears, pulleys, and a variable speed transmission wherein the coupler enables the variation of speed of the first drive shaft and the second drive shaft.

5. The integrated alternator and water pump of claim 1 wherein the first and second drive shafts are operatively coupled by one of a magnetic coupling, a magnetoheological coupling, a viscous coupling, and an electric clutch that enable an engagement and disengagement of the first and second drive shafts.

6. The integrated alternator and water pump of claim 1 wherein at least two water pumps are integrated with the alternator.

7. A method of controlling alternator temperature and engine temperature for a vehicle, comprising:
rotating a first drive shaft to generate electricity during an operation of an engine;
rotating a second drive shaft to cause pumping of coolant to cool at least portion of the alternator and the engine where the first and second drive shafts are operatively coupled such that rotation of the first drive shaft imparts rotation to the second drive shaft; and
selectively routine coolant through multiple different fluid pathways in response to an engine operation condition wherein the engine operation condition is an engine operating temperature and the coolant is routed through a first fluid pathway, which includes the alternator and the engine when the engine temperature is below a first predetermined temperature and the coolant is routed through a second fluid pathway, which includes the alternator, the engine, and a heater core when the engine temperature is above the first predetermined temperature and below a second predetermined temperature.

8. The method of claim 7 wherein the coolant is routed through a third fluid pathway, which includes the water pump, the engine, the heater core, and a radiator when the engine temperature is above the second predetermined temperature.

9. The method of claim 8 wherein the method further includes maintaining a state charge of a battery in the vehicle less than 100% capacity when the temperature is below a first predetermined level wherein the alternator charges the battery during the engine operation.

10. A system for a vehicle, comprising:
an engine;
a first alternator having a first drive shaft configured to be driven by a belt of the engine through a pulley;
a first water pump having a second drive shaft that is operatively coupled with the first drive shaft by a first coupler where rotation of the first drive shaft imparts rotation to the second drive shaft and causes pumping of coolant;
a first fluid pathway passing through the first alternator and the engine;
a second fluid pathway passing through the first alternator, the engine, and a heater core, and having a first valve located therein wherein the first and second fluid pathways have at least partially shared pathways; and
a control system to selectively circulate a coolant via the first and second pathways in response to an engine operating temperature to control the temperature in the engine and the alternator.

11. The system of claim 10 wherein the control system circulates the coolant through the first fluid pathway if the engine operating temperature is below a first predetermined value.

12. The system of claim 11 wherein the control system opens the first valve and circulates the coolant through the second fluid pathway if the engine operating temperature is above the first predetermined value.

13. The system of claim 12 wherein the system further includes a third fluid pathway passing through the first alternator, the engine, the heater core, and a radiator and having a second valve located therein where the first, second, and third fluid pathways have at least partially shared cooling passage.

14. The system of claim 13 wherein the control system opens the first and second valves, and circulates the coolant through the third fluid pathway if the engine operating temperature is above a second predetermined value.

15. The system of claim 14 wherein the coupler is configured to vary the speed of the second drive shaft different from the first drive shaft and the control system increase coolant flow rate to reduce the engine temperature.

16. The system of claim 12 wherein the system further comprising a second alternator having a third drive shaft mounted therein and is configured to be driven by a belt of the engine through a pulley; a second water pump having a fourth drive shaft that is operatively coupled with the third drive shaft by a second coupler where rotation of the third drive shaft imparts rotation to the fourth drive shaft and cause pumping of coolant in a third fluid pathway; and the third fluid pathway passing through the second alternator, the engine, the heater core, and a radiator where the first, second, and third fluid pathways have at least partially shared fluid pathway.

17. The system of claim 16 wherein the control system opens the first and second valves, and circulates the coolant through the third fluid pathway if the engine operating temperature is above a second predetermined value.

18. The system of claim 10 wherein the system further includes a third fluid pathway having a high pressure coolant reservoir wherein the system is configured to circulate a portion of the coolant through the third fluid pathway to enhance cooling upon the engine operating temperature of the engine exceeds a predetermined value.

19. The system of claim 10 wherein the system further includes a high pressure coolant reservoir wherein the system is configured to circulate the coolant from the high pressure coolant reservoir directly to the first alternator to generate electrical power.

20. A system for a vehicle, comprising:
an engine;
an alternator having a first drive shaft mounted therein and is configured to be driven by a belt of the engine through a pulley;
a first water pump having a second drive shaft that is operatively coupled with the first drive shaft by a first coupler where rotation of the first drive shaft imparts rotation to the second drive shaft and cause pumping of coolant;
a second water pump having a third drive shaft that is operatively coupled with the first drive shaft by a second coupler where rotation of the first drive shaft imparts rotation to the third drive shaft and cause pumping of coolant;
a first fluid pathway passing through the alternator, the engine and a heater core;
a second fluid pathway passing through the alternator, the engine, and the heater core, and a radiator, and having a first valve located between the heater core and the radiator wherein the first and second fluid pathways have at least partially shared fluid pathways; and
a control system to selectively circulate a coolant via the first and second pathways in response to an engine operating temperature to control the temperature in the engine and the alternator.

21. The system of claim 20 wherein the control system disengage the operation of the first and second water pumps if the engine operating temperature is below a first predetermined value.

22. The system of claim 21 wherein the control system circulates the coolant through the first fluid pathway if the engine operating temperature is above the first predetermined value and below a second predetermined value.

23. The system of claim 22 wherein the control system disengage the operation of the first water pump, engage the operation of the second water pump, open the first valve, and circulates the coolant through the second fluid pathway if the engine operating temperature is above the second predetermined value.

24. The system of claim 20 wherein the control system maintains a state of charge of battery below 100% of state of charge.

25. The system of claim 20 wherein electrodes or an electronic circuit is connected to the alternator to modify the coolant to be used in components of the vehicle system to improve the operation of the vehicle system.

26. An integrated alternator and water pump for a vehicle engine, comprising:
power electronics;
an alternator rotor mounted on a first drive shaft wherein the alternator is disposed adjacent to the power electronics; and
a water pump impeller mounted on a second drive shaft wherein the water pump impeller is disposed on a periphery of the alternator,
wherein the water pump impeller is configured to cause pumping of coolant in response to rotation of the second drive shaft, and where the first and second drive shafts are operatively coupled such that rotation of the first drive shaft imparts rotation to the second drive shaft and the first and second drive shafts rotate around different rotational axes.

27. The integrated alternator and water pump of claim 26 wherein the first drive shaft is substantially perpendicular to the second drive shaft.

* * * * *